United States Patent
Xin et al.

(10) Patent No.: US 12,095,692 B2
(45) Date of Patent: Sep. 17, 2024

(54) REFERENCE SIGNAL SEQUENCES IN TIME DOMAIN DATA

(71) Applicant: ZTE Corporation, Guangdong (CN)

(72) Inventors: Yu Xin, Guangdong (CN); Jianwei Wang, Guangdong (CN); Tong Bao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 372 days.

(21) Appl. No.: 17/559,723

(22) Filed: Dec. 22, 2021

(65) Prior Publication Data
US 2022/0116175 A1      Apr. 14, 2022

Related U.S. Application Data

(63) Continuation of application No. PCT/CN2019/092525, filed on Jun. 24, 2019.

(51) Int. Cl.
*H04W 56/00* (2009.01)
*H04L 5/00* (2006.01)
*H04L 45/24* (2022.01)

(52) U.S. Cl.
CPC ............ *H04L 5/0048* (2013.01); *H04L 45/24* (2013.01)

(58) Field of Classification Search
CPC .............................. H04L 5/0048; H04L 45/24
USPC ........................................................... 370/329
See application file for complete search history.

(56) References Cited

U.S. PATENT DOCUMENTS

| | | | |
|---|---|---|---|
| 8,837,393 B2 * | 9/2014 | Han ...................... | H04B 7/0669 370/335 |
| 9,894,682 B2 * | 2/2018 | Ogawa .................. | H04W 72/23 |
| 10,524,291 B2 | 12/2019 | Guan et al. | |
| 10,659,273 B2 | 5/2020 | Han et al. | |
| 2013/0330082 A1 * | 12/2013 | Perez De Aranda Alonso ............ | H04J 14/08 398/98 |
| 2018/0062811 A1 * | 3/2018 | Akkarakaran ........ | H04L 5/0007 |
| 2018/0160406 A1 * | 6/2018 | Hao ...................... | H04L 5/0053 |

(Continued)

FOREIGN PATENT DOCUMENTS

| CN | 106658697 A | 5/2017 |
|---|---|---|
| CN | 106900175 A | 6/2017 |

(Continued)

OTHER PUBLICATIONS

"Komori, Automatic Gain Control Circuit And Method Thereof And A Demodulation Device Thereof, Jul. 8, 2009, CN 100512070" (Year: 2002).*

(Continued)

*Primary Examiner* — Sai Ming Chan
(74) *Attorney, Agent, or Firm* — Perkins Coie LLP

(57) ABSTRACT

This patent document discloses techniques that can be implemented in various embodiments to prevent the data transmission rate from decreasing due to the CP and GI while solving the multipath delay problem and maintaining low PAPR and channel estimation accuracy. In some embodiments of the disclosed technology, a wireless communication method can be implemented to generate a transmit waveform that is organized in transmission subframes, wherein a given transmission subframe includes one or more data block each including a data portion and a reference portion, wherein the reference portion includes a part of a reference signal that is included in at least one of the transmission subframes.

15 Claims, 14 Drawing Sheets

(56) References Cited

U.S. PATENT DOCUMENTS

| | | | |
|---|---|---|---|
| 2019/0116610 A1* | 4/2019 | Byun | H04L 27/2613 |
| 2019/0280909 A1* | 9/2019 | Werner | H04L 27/2613 |
| 2020/0187190 A1 | 6/2020 | Gao et al. | |
| 2021/0203459 A1 | 7/2021 | Park et al. | |

FOREIGN PATENT DOCUMENTS

| | | |
|---|---|---|
| CN | 109412764 A | 3/2019 |
| JP | 2019-514270 A | 5/2019 |
| KR | 20100058396 A | 6/2010 |
| WO | 2017173125 A1 | 10/2017 |
| WO | 2018/175178 A1 | 9/2018 |
| WO | 2018174633 A2 | 9/2018 |

OTHER PUBLICATIONS

Japanese office action issued in corresponding Japanese Patent Application No. 2021-576664, dated Jan. 24, 2023, 8 pages. (English summary included).

Japanese office action issued in corresponding Japanese Patent Application No. 2021-576664, dated Sep. 6, 2023, 8 pages. (English summary included).

International Preliminary Report on Patentability issued in International Patent Application No. PCT/CN2019/092525, dated Dec. 28, 2021, 5 pages.

European Search Report for EP Patent Application No. 19935183.4, dated Jun. 13, 2022, 6 pages.

International Search Report and Written Opinion mailed on Mar. 25, 2020 for International Application No. PCT/CN2019/092525, filed on Jun. 24, 2019 (7 pages).

Interdigital, Inc., "Remaining issues on PT-RS," 3GPP TSG RAN WG1 Meeting R1#90bis, Prague, Czech Republic, R1-1718484, 8 pages, Oct. 9-13, 2017.

Chinese office action issued in corresponding Chinese Patent Application No. 201980097887.1, dated Feb. 6, 2024, 18 pages. English translation included.

European office action issued in corresponding EP Patent Application No. 19935183.4, dated Apr. 5, 2024, 5 pages.

\* cited by examiner

REFERENCE SIGNAL SEQUENCES IN TIME DOMAIN DATA

CROSS-REFERENCE TO RELATED APPLICATIONS

This application is a continuation of International Patent Application No. PCT/CN2019/092525, filed on Jun. 24, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for preventing the data transmission rate from decreasing due to the CP and GI while solving the multipath delay problem and maintaining low PAPR and channel estimation accuracy.

In one example aspect, a wireless communication method is disclosed. The method includes generating a transmit waveform that is organized in transmission subframes, wherein a given transmission subframe includes one or more data block each including a data portion and a reference portion, wherein the reference portion includes a part of a reference signal that is included in at least one of the transmission subframes.

In another example aspect, a wireless communication method is disclosed. The method includes generating a transmit waveform that is organized in transmission subframes, wherein a given transmission subframe includes a data portion, a first reference portion, and a second reference portion, wherein each of the first and second reference portions includes a part of a reference signal that is included in at least one of the transmission subframes, wherein the first reference portion is arranged in front of the data portion and the second reference portion is arranged behind the data portion, and adjusting, based on control information, a length of the second reference portion.

In another example aspect, a wireless communication method is disclosed. The method includes generating a transmit waveform that is organized in transmission subframes, wherein a given transmission subframe includes a set of data blocks, wherein each data block includes a data portion and at least one reference portion, wherein the at least one reference portion includes a part of a reference signal that is included in at least one of the transmission subframes, and adjusting, based on control information, lengths of the data portions and lengths of the reference portions.

In another example aspect, a wireless communication method is disclosed. The method includes receiving a transmit waveform that is organized in transmission subframes, wherein a given transmission subframe includes a data portion and a reference portion, wherein the reference portion includes a copy of a part of a reference signal that is included in at least one of the transmission subframes, and determining wireless communication information with respect to a subframe based on the reference portion in the subframe.

In another example aspect, a wireless communication method is disclosed. The method includes receiving a transmit waveform that is organized in transmission subframes, wherein a given transmission subframe includes a data portion, a first reference portion, and a second reference portion, wherein each of the first and second reference portions includes a part of a reference signal that is included in at least one of the transmission subframes, wherein the first reference portion is arranged in front of the data portion and the second reference portion is arranged behind the data portion, and determining wireless communication information with respect to a subframe based on at least one of the first and second reference portions in the subframe.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Figure 1A:
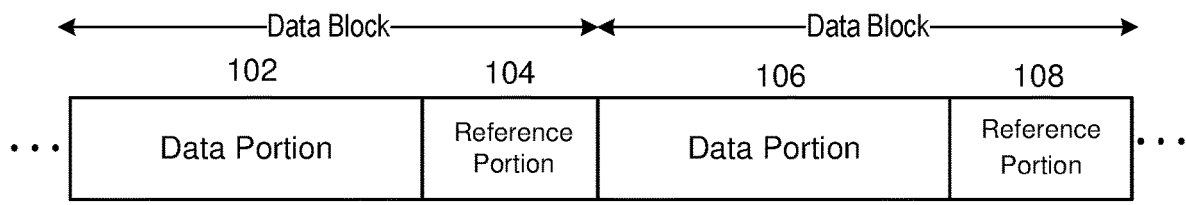
FIG. 1A shows a schematic diagram of data blocks each including a data portion and a reference portion.

In this patent document, certain features are described using the example of 4G LTE or 5G wireless protocol. However, applicability of the disclosed techniques is not limited to only 4G LTE or 5G wireless systems.

Long-Term Evolution (LTE), which is the fourth generation (4G) standard for high-speed wireless communication, uses Orthogonal Frequency Division Multiplexing (OFDM) to share the wireless channel and achieve a high data transmission rate. The OFDM divides a given channel into many narrower subcarriers. The spacing is such that the subcarriers are orthogonal to minimize interference. Cyclic prefix (CP) can be used as the guard interval in OFDM systems to mitigate the effect of multipath delay. On the other hand, the CP represents an overhead that needs to be minimized since it does not carry any useful data and thus the length of CP can impact the data transmission rate. Furthermore, in wireless mobile communications where wireless channel environment is constantly changing, the fixed-length CP is very difficult to deal with multipath delay issues. Moreover, the spectrum leakage in the OFDM systems with CP is relatively large, and the peak-to-average ratio is also relatively high. Therefore, it is necessary to design a suitable waveform scheme to solve these problems.

Discrete Fourier Transform spread OFDM (DFT-s-OFDM) technology based on CP-OFDM is applied prior to subcarrier mapping to minimize the CP-OFDM high Peak Average Power Ratio (PAPR) problem. Fifth Generation New Radio (5G NR) of the first version of Third Generation Partnership Project (3GPP) standard has been finalized, but these communication technologies are still used as bases for CP-OFDM waveform.

The OFDM system with CP (CP-OFDM) divides the frequency selective channel into a set of parallel flat channels, thereby simplifying channel estimation and providing a higher channel estimation accuracy. The CP-OFDM can also solve the multipath delay problem, but the CP does not carry any useful data, thus increasing the wireless frequency physical resource overhead.

The CP-OFDM based spectrum waveform leakage is also relatively large. The 5G NR supports different sets of parameters (Numerology), but it does not support the same subcarrier spacing between adjacent sub-bands, resulting in some interference between adjacent sub-bands. Although spectrum leakage and interference between sub-bands can be slightly reduced by some implementation techniques, such as using a soft CP or a filtering method, a certain guard interval is still required between sub-bands of different sub-carrier spacing. This reduces spectral efficiency.

For a high-frequency scenario, the current IEEE 802.11ad protocol technology using low PAPR single carrier (SC) signals has guard intervals (GI) to support a channel estimation, time/frequency tracking, phase noise compensation. However, the length of the GI is fixed and cannot be flexibly adapted to changes in the wireless channel environment, thereby reducing spectral efficiency.

This patent document discloses techniques that can be implemented in various embodiments to prevent the data transmission rate from decreasing due to the CP and GI while solving the multipath delay problem and maintaining low PAPR and channel estimation accuracy. In some embodiments of the disclosed technology, a wireless communication method can be implemented to generate a transmit waveform that is organized in transmission subframes in which a given transmission subframe includes a data portion and a reference portion such that the reference portion includes a copy of a part of a reference signal that is included in at least one of the transmission subframes.

Figure 1B:
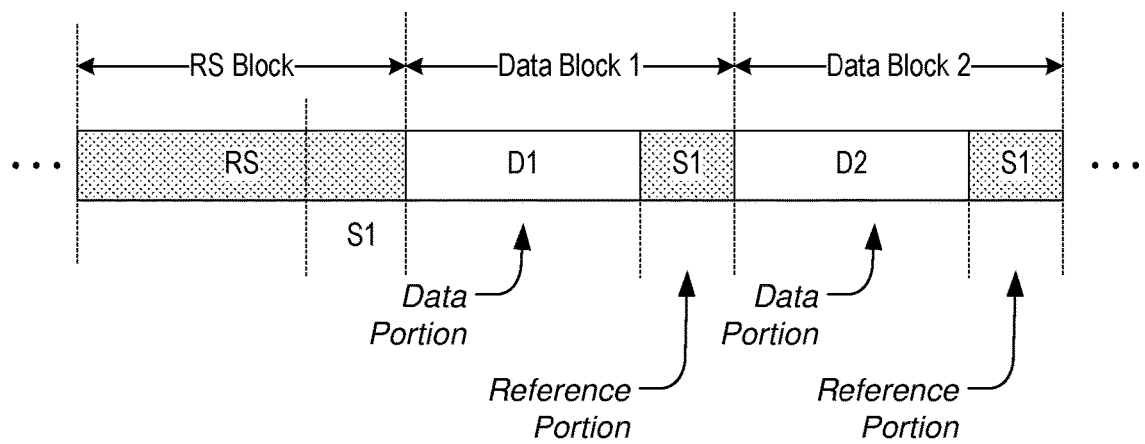
FIG. 1B shows a schematic diagram of data blocks and a reference block that are organized in frames.

FIG. 1A shows a schematic diagram of data blocks each including a data portion and a reference portion. In some implementations, a reference portion 104, 108 is copied from at least part of a reference signal (not shown) and inserted behind a data portion 102, 106 of a data block. FIG. 1B shows a schematic diagram of data blocks and a reference block that are organized in frames. A tail sequence S1 of a reference signal RS is inserted behind each first data sequence D1, D2 to form a first data block Data Block 1 and a second data block Data Block 2, respectively. In some implementations, the first data sequence D1, D2 can constitute the data portion 102, 106, and the tail sequence S1 of the reference signal RS can constitute the reference portion 104, 108 inserted behind the data portion 102, 106. The first data sequence D1 and the tail reference sequence S1 constitute the first data block Data Block 1 and the first data sequence D2 and the tail reference sequence S1 constitute the second Data Block 2.

The reference signal RS is transmitted in a reference signal block RS Block. The reference portion S1 is a part of a reference signal RS. For example, a part (e.g., tail sequence) of a reference signal RS is copied and inserted behind the data portion D1, D2 as the reference portion S1. In an implementation, the tail sequence S1 of the reference signal RS may be a tail sequence of the time domain signal sequence of the reference signal S1.

In some implementations, if the reference signal sequence is mapped and transmitted on the time domain resource, the tail sequence S1 of the reference signal is a tail part of the reference signal sequence, and if the reference signal sequence is mapped and transmitted on the frequency domain resource, the tail sequence S1 is a tail part of the time domain signal sequence of the reference signal that is obtained after performing inverse fast Fourier transform (IFFT). The IFFT process may include oversampling, but it can be performed without oversampling.

A reference portion copied from a reference signal is inserted behind a data portion of a first data sequence to form a second data sequence. In some implementations, the length of the data portion of the first data sequence can be adjusted such that the second data sequence has the same length as the reference signal sequence. For example, a tail sequence of reference signals of different lengths is inserted behind the plurality of first data sequences to form a plurality of second data sequences of the same length. The plurality of second data sequences are transmitted in a plurality of data blocks. Here, the length may refer to both the length in time and the number of elements included in the tail sequence.

Figure 2A:
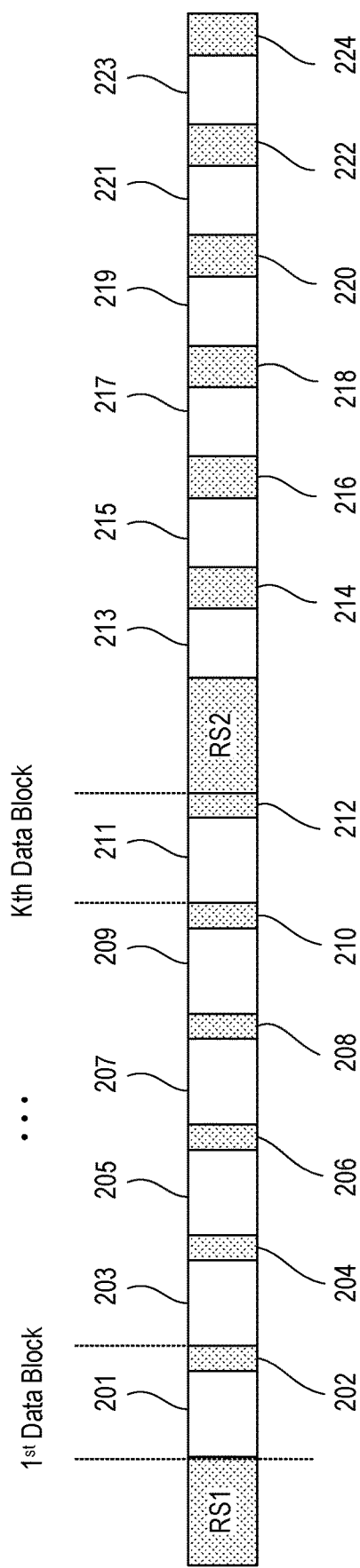
FIGS. 2A and 2B show examples of a waveform that is organized in transmission frames in which a given transmission frame includes data portions and reference portions, the lengths of which can be adjusted.
Figure 2B:
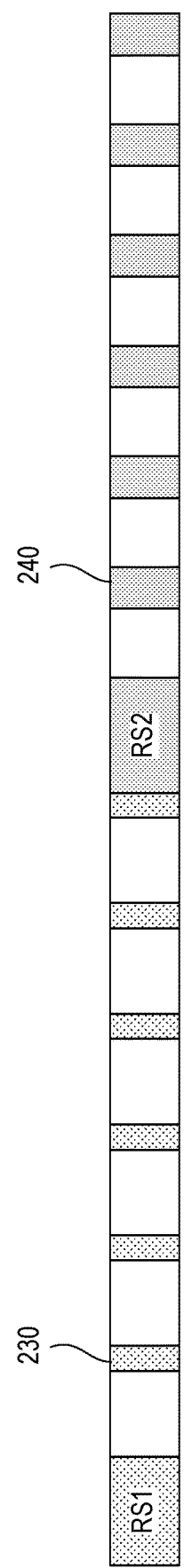

FIGS. 2A and 2B show examples of a waveform that is organized in transmission frames in which a given transmission frame includes data portions and reference portions, the lengths of which can be adjusted. In an embodiment of the disclosed technology, the length of reference portion inserted behind each data portion can be adjusted based on the wireless channel environment such as the multipath delay. When the wireless channel environment changes, the length of the tail sequence of the reference signal that is inserted behind each data portion (e.g., 213) can be adjusted, starting from the first data block following the reference signal block, the length-adjusted tail sequence of the reference signal (e.g., 214) is inserted behind each data portion as a reference portion after adjusting the length of the data portion. For example, among the K data blocks arranged between the two reference signal blocks RS1 and RS2, the same tail sequence of the reference signal block RS1 is inserted behind each data portion 201, 203, 205, 207, 209, 211 arranged between the two reference signal blocks RS1 and RS2. Such data and reference signal sequences are used in the uplink, and in some implementations the data and reference signal sequences may also be used in the downlink.

As an example, the reference portions 202, 204, 206, 208, 210, 212 are inserted behind data portions, 201, 203, 205, 207, 209, 211, respectively, to mitigate the effect of environmental factors such as the multipath delay. When the wireless channel environment in which the terminal is located changes (e.g., when the multipath delay increases), the tail sequence of the reference signal is lengthened. In an embodiment of the disclosed technology, the lengths of data portions 213, 215, 217, 219, 221, 223 following the next reference signal are shortened, and the reference portions 214, 216, 218, 220, 222, 224 inserted behind the data portions 213, 215, 217, 219, 221, 223 are lengthened to respond to the environment changes. Similarly, when the multipath delay decreases, the length of the tail sequence can be reduced, and the first data block following the reference signal block begins to reduce the length of the tail sequence.

As shown in FIG. 2B, when the reference signal RS1 is different from the reference signal RS2, the tail sequences 230 of data blocks behind RS block with RS1 are different from the tail sequences 240 of data blocks behind RS block with RS2. Here, the tail sequences 230 of data blocks between two RS blocks are the same as the tail part of the reference signal RS1 of the first RS block, and the tail sequences 240 of data blocks after the second RS block with RS2 are the same as the tail part of the reference signal RS2 of the second RS block.

Although not shown in FIG. 2B, head sequences of data blocks that are arranged between the two reference signals RS1 and RS2 may be different from head sequences of data blocks that are arranged after the reference signal RS2. When the reference signal RS1 is different from the reference signal RS2, the head sequences of data blocks behind RS block with RS1 are different from the head sequences of data blocks behind RS block with RS2. The head sequences of data blocks between two RS blocks are the same as the head part of RS of the first RS block.

In another embodiment of the disclosed technology, among the K−1 data blocks between the two reference signal blocks, the lengths of the tail sequences inserted after the first data sequence are rehearsed in descending order, where K is the number of data blocks between two reference signal blocks. The tail sequence with longer length includes the tail sequence with shorter length. Furthermore, in the last data block between the two reference signal blocks, the length of the tail sequence inserted after the first data sequence is greater than or equal to the tail sequence of the first data block following the reference signal block behind the data block. This data portion and reference portion sequence is used in the uplink, and, in some implementations, may also be used in the downlink.

In some implementations, when different users are time division multiplexed in the downlink, and K data blocks between two reference signal blocks can be allocated to J different users (K>=J). When different users (or terminals) are in different wireless channel multipath delays, the length of the tail sequence inserted after the first data sequence may be different. Therefore, the lengths of the tail sequences of the K data blocks will be different. In order to ensure that the tail sequence of the previous data block has sufficient length as the cyclic prefix (CP) of the subsequent data block, the K data blocks are allocated to J according to the order of the multipath delay sizes of J different users. For the user who has allocated the last data block, although the multipath delay is relatively small, in order to ensure that the reference signal block behind the data block has a CP of sufficient length, the length of the tail sequence of the last data block needs to be greater than or equal to the length of the tail sequence of the first data block following the reference signal block following the data block.

Although the length of the inserted tail sequence is different, the length of the data sequence formed by combining the data portions and the reference portions are the same as one another. Therefore, when the length of the reference portion (inserted tail sequence) is different, the length of the data portion is also different such that the combined length of the data portion and the reference portion remains the same.

Suppose two tail sequences S1 and S2 of different lengths are provided in a first data sequence of length L where the length of S1 is LS1 and the length of S2 is LS2. When two tail sequences S1 and S2 are inserted behind each data portion, the length of two second data sequences (two data portions) will be (L-LS1) and (L-LS2), respectively.

The reference signal sequence is a pi/2 Binary Phase Shift Keying (BPSK) modulated sequence, or the reference signal sequence is a Zadoff-Chu (ZC) sequence, or the reference signal sequence is a Golay sequence, or the reference signal sequence is an M sequence.

A communication system determines whether to insert a long sequence or a short sequence after the first data sequence according to the wireless channel environment or other rules.

In some embodiments of the disclosed technology, the second data sequence length is a window length of the subsequent FFT processing. In some embodiments of the disclosed technology, the length of the second data sequence is equal to the reciprocal of the subcarrier spacing. For example, when the subcarrier spacing is 60 kHz, the length of the second data sequence is 1/60 milliseconds. In some embodiments of the disclosed technology, the starting and ending positions of the second data sequence are starting and ending positions of the subsequent FFT processing.

In some embodiments of the disclosed technology, a transmission of the second data sequence may include performing FFT processing on the second data sequence, and then performing subcarrier mapping (when some subcarriers place data 0, oversampling can be implemented), then performing IFFT processing, and then transmitting a new data sequence after IFFT processing. As an example, FFT processing includes the concept of DFT processing, and IFFT processing includes the concept of IDFT processing.

Alternatively, the transmission of the second data sequence may include filtering and digital-to-analog converting the second data sequence, and then transmitting the digital-to-analog converted signal. This can be done without performing FFT and IFFT processing.

Figure 3A:
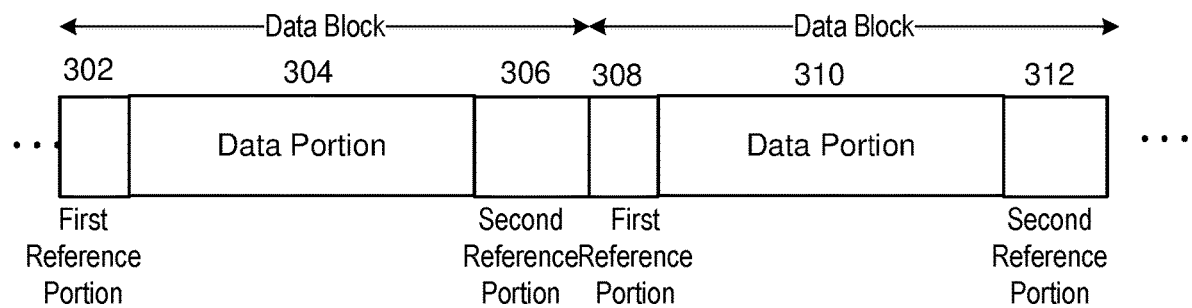
FIG. 3A shows a schematic diagram of data blocks each including a data portion and a reference portion.
Figure 3B:
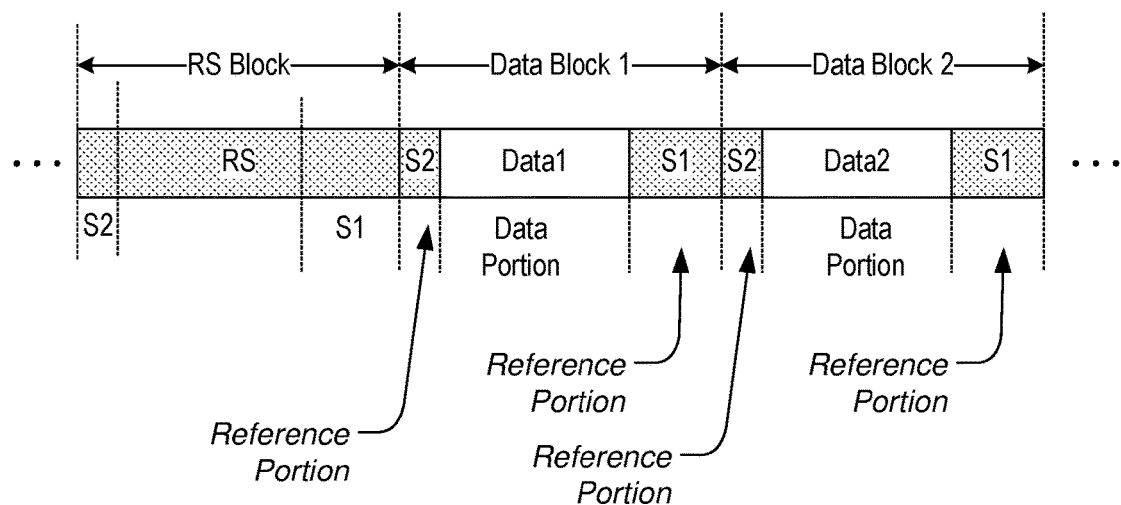
FIG. 3B shows a schematic diagram of data blocks and a reference block that are organized in transmission frames.

FIG. 3A shows a schematic diagram of data blocks each including a data portion and a reference portion. In some implementations, a first reference portion 302, 308 is copied from at least part of a reference signal (not shown) and inserted in front of a data portion 304, 310 of a data block, and a second reference portion 306, 312 is copied from at least part of the reference signal and inserted behind the data portion 304, 310 of the data block. FIG. 3B shows a schematic diagram of data blocks and a reference block that are organized in transmission frames. In some embodiments, the set of time-domain symbols is a subset of symbols in a subframe or a resource block used in a multi-carrier communication system.

In an embodiment of the disclosed technology, a head sequence of the reference signal is inserted in front of the second data sequence, in which the first data sequence and the tail sequence of the reference signal inserted behind the first data sequence are arranged, to form a third data sequence. In another embodiment of the disclosed technology, the head sequence and the tail sequence of the reference signal can be directly inserted in front of and behind the first data sequence to form a third data sequence.

A change in the extent of the multipath in the wireless channel does not affect the length of the first sequence. If the transmission bandwidth is widened, the number of data elements that can be transmitted in one block may increase. If the length of the block becomes longer, the number of data elements that can be transmitted in one block becomes larger, and the number of data elements contained in the first sequence remains unchanged. When the data transfer rate in the block (e.g., the number of data elements that can be transferred per unit time) changes, the length of the first sequence changes. In the other words, when the transmission bandwidth is widened (or shorten), the length of the first sequence changes shorter (or longer) in time.

As an example, assume that the first sequence contains 10 elements, regardless of the wireless channel environment, no matter how wide the transmission bandwidth is, and no matter how long the block length is, the number of elements in the first sequence does not change. If the time interval before each adjacent element is Ts, the length of the first sequence is 10 Ts. When Ts changes, that is, when the data transmission rate in the block changes, the length of the first sequence changes.

In some embodiments of the disclosed technology, the third data sequence length is a window length of the subsequent FFT processing. In some embodiments of the disclosed technology, the third data sequence length is equal to the reciprocal of the subcarrier spacing; for example, when the subcarrier spacing is 60 kHz, the third data sequence length is 1/60 milliseconds. In some embodiments of the disclosed technology, the starting and ending position of the third data sequence is a starting and ending position of the subsequent FFT processing. In some embodiments of the disclosed technology, the start and stop positions of the subsequent FFT processing are respectively the inserted first sequence and the tail sequence.

The transmission of the second data sequence may also include performing FFT processing on the third data sequence, and then performing subcarrier mapping (when some subcarriers place data 0, oversampling can be implemented), then performing IFFT processing, and then transmitting new data sequence after IFFT processing. (In this patent, FFT processing includes the concept of DFT processing, and IFFT processing includes the concept of IDFT processing)

Alternatively, the transmission of the second data sequence may further include filtering and digital-to-analog converting the third data sequence, and then transmitting the digital-to-analog converted signal. This can be done without performing FFT and IFFT processing.

The communication system determines whether to insert a long sequence or a short sequence after the first data sequence according to the wireless channel environment. The indication information is added in a control information format, and according to the indication information, the length of the tail sequence in which the reference sequence is inserted after the first data sequence can be determined. In an implementation, the control information format may be a control information format transmitted by a downlink or uplink control channel. In another implementation, the control information format is a control information format of downlink or uplink radio resource control (RRC) signaling transmission. That is, the control information is transmitted through a downlink or uplink control channel, or the control information is transmitted through downlink or uplink RRC signaling. The control information is also transmitted through another channel such as a broadcast channel. The length of the first data sequence may also be determined according to the indication information indicating the data sequence includes the number of data elements.

The embodiments of the disclosed technology can be used for uplink, when user's communication system scenario or wireless channel environment changes, or when the efficiency requirements for transmitting data change, or when the performance requirements for resisting multipath delay change. Tail sequences of different lengths, from one or more reference signal blocks, are inserted behind the data portions following a reference signal block, and the lengths of the tail sequences remain unchanged until the communication system or wireless channel environment changes.

The embodiments of the disclosed technology can be used for the downlink, when the communication system scenario or the wireless channel environment of the user changes, or when the efficiency requirement for transmitting data changes, or when the performance requirement for resisting multipath delay changes. When the length of tail sequence is adjusted due to the changes in the wireless channel environment after inserting the tail sequence assigned to the user, the adjusted tail sequence is inserted after the data block position of the user is re-allocated according to the order of the multipath delay of different users.

When a transmitting end sends data to a receiving end, it first determines the length of the reference sequence inserted behind the first data sequence according to a predetermined rule. The receiving end performs channel estimation and demodulation of data. When it is determined, through channel estimation, that the radio channel environment has been changed, the information is fed back to the transmitting end (or the receiving end periodically feeds back the channel state information to the transmitting end), and the transmitting end sends data according to the channel environment. When the changed information or other performance requirements change, the length of the first data sequence and the length of the inserted sequence are changed, and the receiving end is notified by the indication information. The indication information may include any type of information that expressly or implicitly indicates the changes in the wireless channel environment, such as changes in the sequence of the reference signal, and the receiving end determines the indication information by blindly detecting the reference signal sequence.

In some embodiments of the disclosed technology, the length of the inserted sequence can be changed on a subframe basis or a slot basis. When the communication system scenario or the wireless channel environment changes (e.g., when the efficiency requirements for transmitting data change, or when the performance requirements for resisting multipath delays change), the first data sequence is changed in subsequent subframes or slots. In other words, the length of the inserted sequence is adjusted in subsequent subframes or slots. In an implementation, 1 subframe includes a plurality of data blocks. For example, in the LTE, the subframe includes 14 OFDM symbols, i.e., 14 data blocks.

The advantage of inserting the tail sequence of the reference signal behind the first data sequence is that the tail sequence of the reference signal block can be used as a cyclic prefix for the next data block. The tails of all blocks (including data blocks and reference signal blocks) in a subframe are the same tail sequence, so the tail of all blocks can be used as the cyclic prefix of the next block. Unlike a normal CP, the tail sequence inserted behind the data portion based on some embodiments of the disclosed technology can be used for some other functions such as auxiliary channel estimation, auxiliary phase tracking, and auxiliary synchronization in addition to the function as a CP. Therefore, the tail sequence can also be referred to as a type of reference sequence.

In some embodiments of the disclosed technology, a head sequence and a tail sequence of the reference signal are inserted in front of and behind the first data sequence, respectively, to form a third data sequence. This has the advantage that all data blocks and reference signal blocks are identical at the beginning and the end, so that after digital-to-analog conversion (DAC), the continuity of the time domain signal can be maintained, which can reduce out-of-band leakage.

In a wireless communication system, the wireless channel environment is always changing. When the size of the multipath delay of the radio channel changes, the cyclic prefix CP length of different data blocks may vary. The advantage of inserting tail sequences of different lengths after the plurality of first data sequences is that since the tail sequence can be used as the cyclic prefix CP of the subsequent data block, it is possible to flexibly select different CPs according to the amount of the multipath delay of the wireless channel, thereby improving spectral efficiency.

In some embodiments of the disclosed technology, the second data sequence (or the third data sequence) has the same length as each other, and thus even if the inserted sequences are different in length, that is, even if the CPs are different, the length of the data blocks is the same, so that the interval of the subcarriers remains the same during the FFT operation. In some embodiments, the set of time-domain symbols is a subset of symbols in a subframe or a resource block used in a multi-carrier communication system.

When the length of the tail sequence changes, the first data block following the reference signal block begins to change the length of the tail sequence. This has the advantage that since the reference signal block contains a tail sequence of any length, the length of the tail sequence of subsequent data block can be flexibly adjusted to have a suitable length of CP in the reference signal block.

Among the K−1 data blocks between the two reference signal blocks, the lengths of the tail sequences inserted after the first data sequence are rehearsed in descending order. This has the advantage that the previous data block has a tail sequence of sufficient length as the CP for the following data block.

The last data block between two reference signal blocks has a tail sequence length greater than or equal to the tail sequence length of the first data block following the second reference signal block. This has the advantage of ensuring that the tail sequence of the last data block has a sufficient length as the CP for the second reference signal block, so that the user after the reference signal block is not interfered by the multipath delay when making the channel estimation The indication information is added in the control information format, and according to the indication information, the length of the tail sequence in which the reference sequence is inserted after the first data sequence can be determined. The advantage of this is that the system can adjust the length of the insertion sequence according to the amount of the multipath delay of the wireless channel in a timely and flexible manner, thereby maximizing the spectrum efficiency. The receiving end knows the length of the inserted sequence and the length of the first data sequence according to the indication information.

Figure 4:
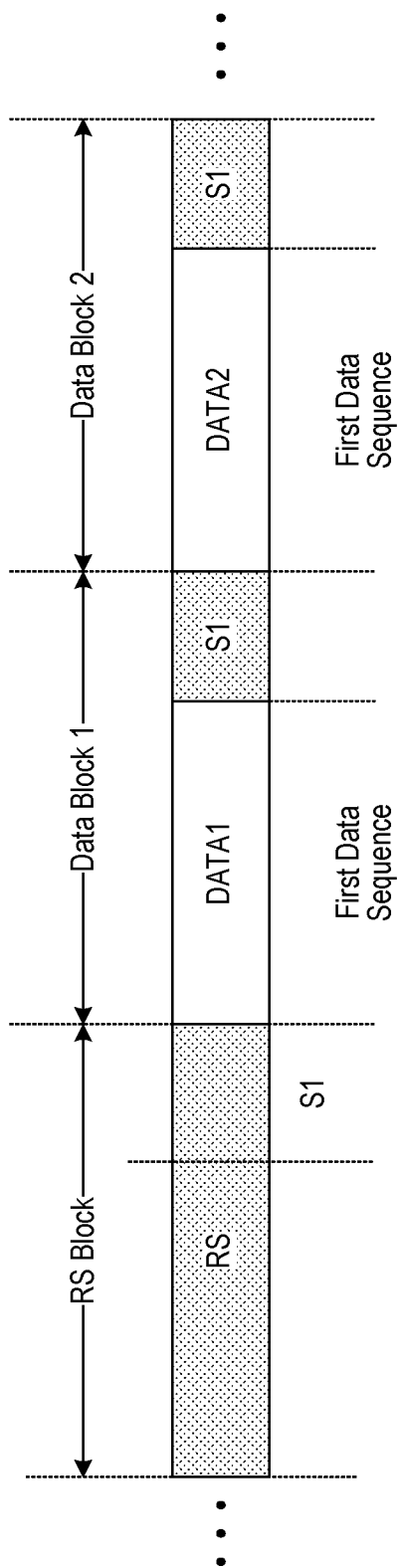
FIG. 4 shows a schematic diagram of data blocks and a reference block that are organized in transmission frames.

FIG. 4 shows a schematic diagram of data blocks and a reference block that are organized in transmission frames. In an embodiment of the disclosed technology, a tail sequence of a reference signal is inserted behind a first data sequence. Although FIG. 4 shows only two data blocks and one reference signal block, a transmission frame may include a plurality of data blocks Data Block1, Data Block2 and one or more reference signal blocks RS. A tail sequence S1 included in the time domain reference signal RS of the reference signal block is inserted after the first data sequence Data1 of the first data block Data Block 1 to form a second data sequence. The tail sequence S1 of the reference signal RS of the reference signal block is also inserted after the first data sequence Data2 of the second data block Data Block 2. The reference signal block RS and the two data blocks Data Block 1, Data Block 2 have the same length as one another.

Figure 5:
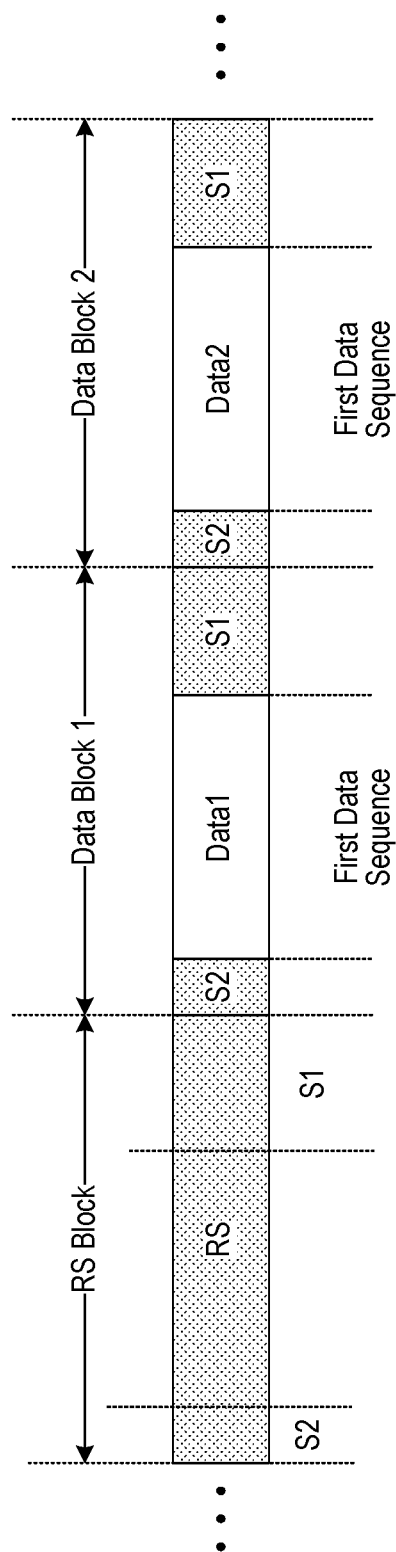
FIG. 5 shows another schematic diagram of data blocks and a reference block that are organized in transmission frames.

FIG. 5 shows another schematic diagram of data blocks and a reference block that are organized in transmission frames. A head sequence and a tail sequence of the reference signal are respectively inserted in the front and rear of the first data sequence. Although FIG. 5 shows only two data blocks and one reference signal block, a transmission frame may include a plurality of data blocks Data Block1, Data Block2 and one or more reference signal blocks RS. The head sequence S2 and the tail sequence S1 included in the time domain reference signal RS of the reference signal block are inserted in front of and behind the first data sequence Data1 of the first data block Data Block 1, respectively, to form a third data sequence. The head sequence S2 and the tail sequence S1 are also inserted in front of and behind the first data sequence Data2 of the second data block Data Block 2. The reference signal block RS and the two data blocks Data Block 1, Data Block 2 have the same length as one another. When the amount of the multipath delay changes, the length of the tail sequence S1 may change, but the length of the head sequence S2 remains unchanged.

Figure 6:
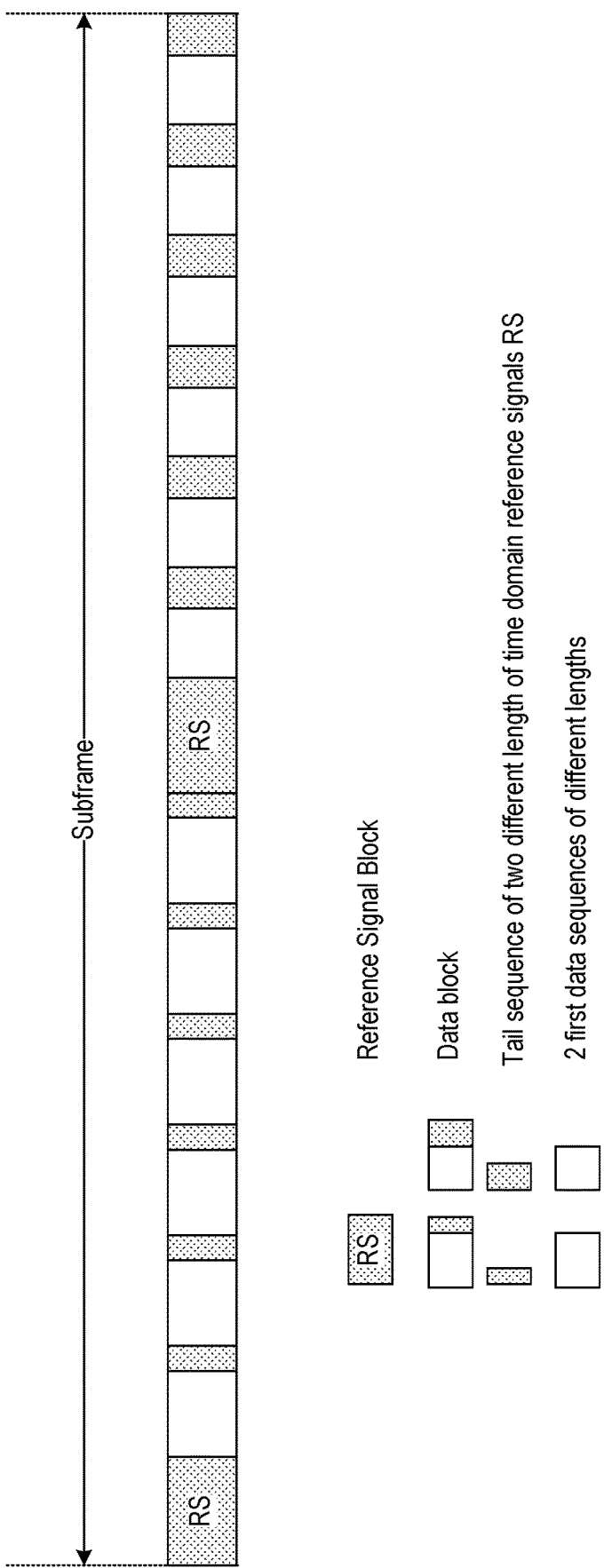
FIG. 6 shows a schematic diagram of data blocks and reference blocks that are organized in a subframe where a tail sequence of a reference signal is inserted after the first data sequence in the uplink.

FIG. 6 shows a schematic diagram of data blocks and reference blocks that are organized in a subframe or a slot where a tail sequence of a reference signal is inserted after the first data sequence in the uplink. It is assumed that the subframe includes 14 blocks, including 2 reference blocks RS and 12 data blocks. The length of each of the 14 blocks are the same. A trail sequence of the reference signals is inserted after the first data sequence in each data block. In this example, it is assumed that the first and eighth blocks are reference signal blocks RS.

The first 6 data blocks are inserted with the same reference portions, each of which is the tail sequence of reference signals. Since each of these reference portions used as CP for the first six data blocks is relatively short, the multipath delay that the data blocks can resist is relatively small, whereas the data transmission efficiency is relatively high. When the wireless channel environment changes and the multipath delay becomes large, a longer tail sequence is inserted beginning from the first data block following the subsequent reference signal block to overcome the larger multipath delay. In this example, the reference portions inserted after the first data sequence of the second 6 data blocks following the second reference signal block RS is the same as one another.

Figure 7:
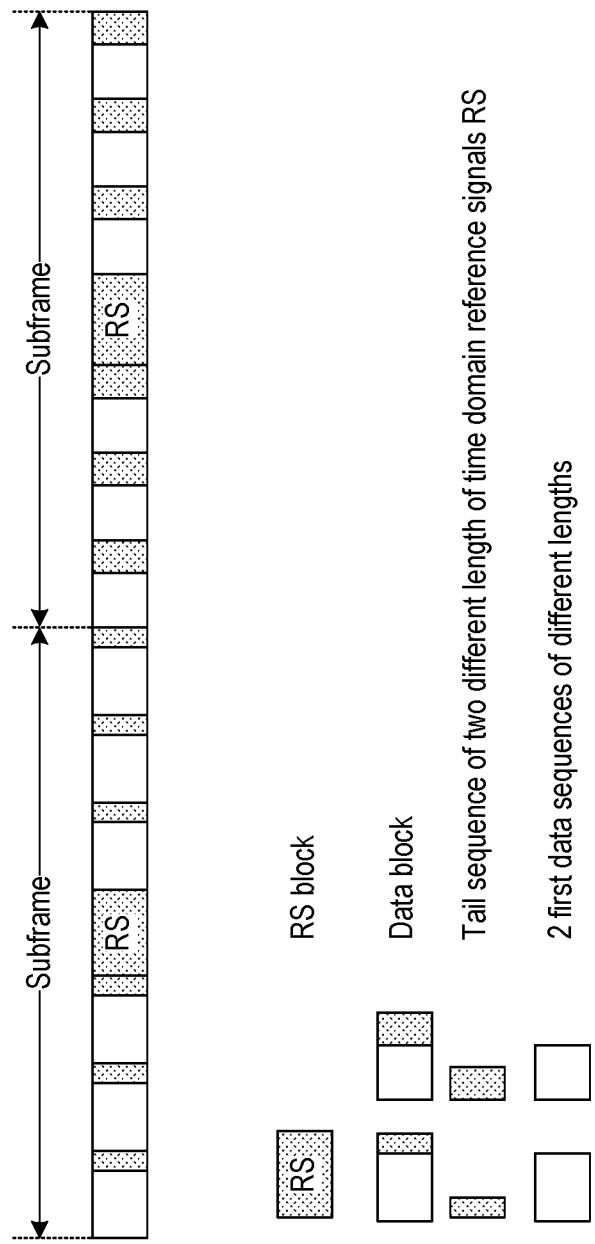
FIG. 7 shows an example of two consecutive subframes each including data blocks and a reference block.

FIG. 7 shows an example of two consecutive subframes (or slots) each including data blocks and a reference block. In an uplink, a tail sequence of the reference signal is inserted behind the first data sequence. In an embodiment of the disclosed technology, the length of the inserted tail sequence changes on a subframe basis. In another embodiment of the disclosed technology, the length of the inserted tail sequence changes on a slot basis.

Each subframe includes 7 blocks, including 1 reference block and 6 data blocks. The 14 blocks in the two subframes have the same length as one another. A trailing sequence of reference signals is inserted after the first data sequence in each data block. In this example, the fourth block in each subframe is the reference signal block RS.

The 6 data blocks in the first subframe are inserted with the same reference portions, each of which is the tail sequence of reference signals. Since each of these reference portions used as CP for the first six data blocks is relatively short, the multipath delay that the data blocks can resist is relatively small, whereas the data transmission efficiency is relatively high. When the wireless channel environment changes and the multipath delay becomes large, a longer tail sequence is inserted beginning from the first data block of the next subframe (or slot) to overcome a larger multipath delay. In this example, the tail sequence inserted after the first data sequence of each data block in each subframe is the same as one another.

Figure 8:
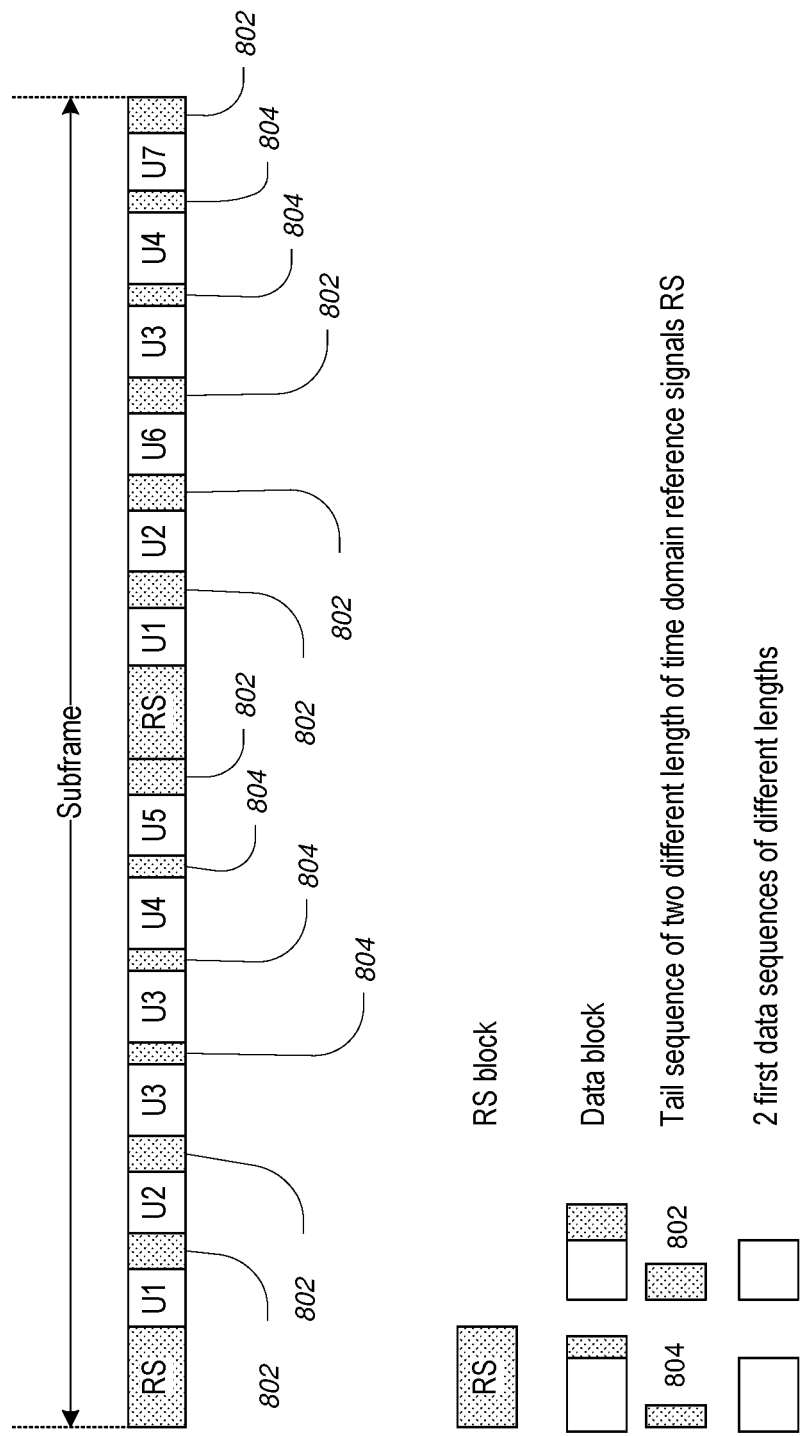
FIG. 8 shows an example of a modulation process in which a plurality of users inserts time division sequences of different lengths into a plurality of first data sequences in a different data block by using a time division multiplexing method in the downlink.

FIG. 8 shows an example of a modulation process in which a plurality of users are allocated to different data blocks by using a time division multiplexing method in the downlink, and sequences of different lengths are inserted into a plurality of first data sequences in different data blocks.

It is assumed that each subframe (or slot) includes 14 blocks, including 2 reference blocks RS and 12 data blocks. The length of each of the 14 blocks are the same. A trail sequence of the reference signals is inserted after the first data sequence in each data block. In this example, it is assumed that the first and eighth blocks are reference signal blocks RS. It is also assumed that two tail sequences 802, 804 of different lengths are used.

In the first six data blocks, the multipath delay of the radio channel experienced by user 1 (U1) and user 2 (U2) is relatively large, and thus a long tail sequence 802 is inserted behind each of the U1 and U2. The multipath delay of the wireless channel experienced by user 3 (U3) and user 4 (U4) is relatively small, and thus a short tail sequence 804 can be inserted behind the U3 and U4. Although the multipath delay of the radio channel experienced by user 5 (U5) is relatively small, since the next reference signal block will follow the U5, the long tail sequence 802 is inserted behind U5 to ensure that U1, U2, U6, U3, U4 and U7 following the next reference signal block have enough time for channel estimation for the reference signal.

Figure 9:
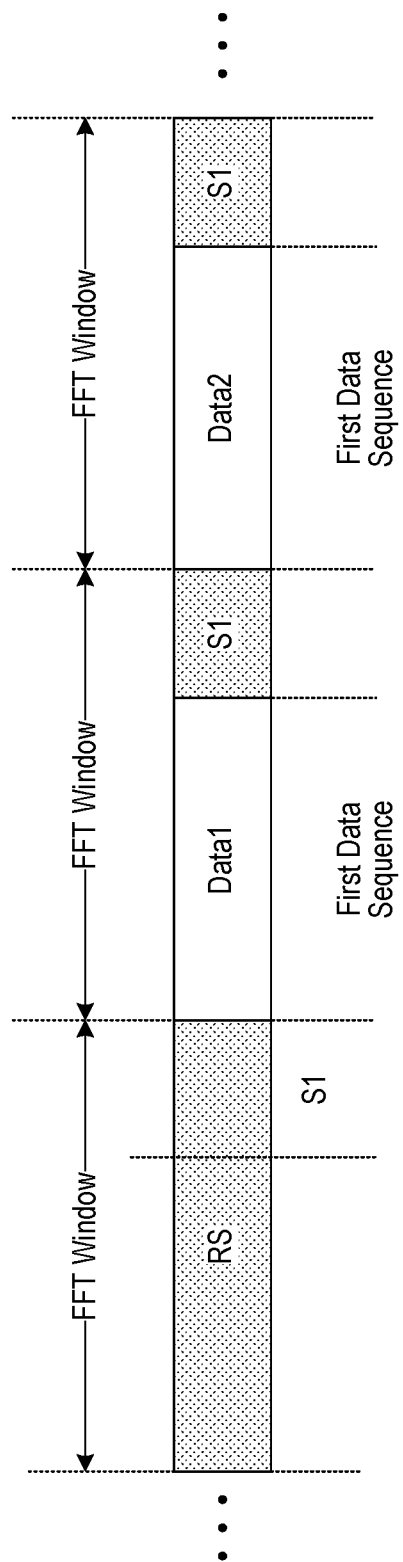
FIG. 9 shows an example of a modulation process in which a tail sequence of a reference signal is inserted after the first data sequence.

FIG. 9 is a diagram showing an example of a modulation process in which a tail sequence of a reference signal is inserted after the first data sequence. In an embodiment of the disclosed technology, a tail sequence of a reference signal is inserted behind a first data sequence. Although FIG. 9 shows only two data blocks and one reference signal block, a transmission frame may include a plurality of data blocks Data Block1, Data Block2 and one or more reference signal blocks RS. A tail sequence S1 included in the time domain reference signal RS of the reference signal block is inserted after the first data sequence Data1 of the first data block Data Block 1 to form a second data sequence. The tail sequence S1 of the reference signal RS of the reference signal block is also inserted after the first data sequence Data2 of the second data block Data Block 2. The reference signal block RS and the two data blocks Data Block 1, Data Block 2 have the same length as one another.

Two tail sequences S1 of the reference signal are inserted behind two first data sequence Data 1 and Data 2 to form two second data sequences. Each of the window length of the two second data sequences for subsequent FFT processing is the same as one another. The start and end positions of the subsequent FFT processing is the same as the start and end positions of the second data sequences. The two second data sequences are sequentially transmitted in adjacent OFDM symbols.

Figure 10:
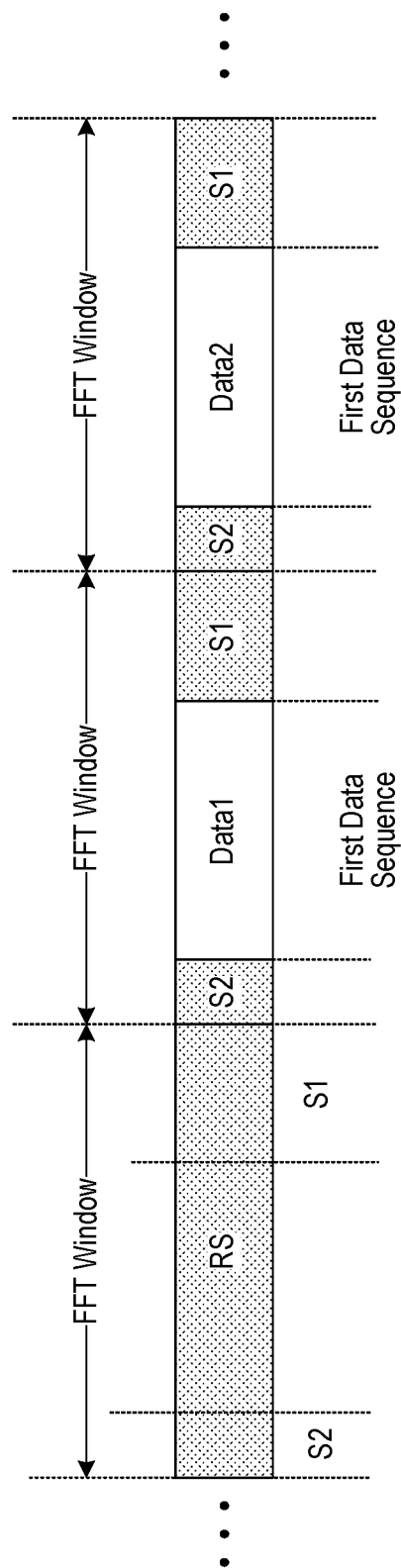
FIG. 10 shows an example of a modulation process in which a head sequence and a tail sequence of a reference signal are inserted in front of and behind the first data sequence, respectively.

FIG. 10 is a diagram showing an example of a modulation process in which a head sequence and a tail sequence of a reference signal are inserted in front of and behind the first data sequence, respectively. Although FIG. 10 shows only two data blocks and one reference signal block, a transmission frame may include a plurality of data blocks Data Block1, Data Block2 and one or more reference signal blocks RS.

The head sequence S2 and the tail sequence S1 of the time domain reference signal RS of the reference signal block are inserted in front of and behind the first data Data1 sequence of the first data block. The reference signal block RS and the two data blocks Data Block 1, Data Block 2 have the same length as one another.

The head sequence S2 and the tail sequence S1 of the reference signal are inserted in front of and behind the first data sequence of two data blocks, respectively, to form two third data sequences. The window lengths of the two third data sequences for subsequent FFT processing are the same as one another. The start and end positions of the subsequent FFT processing is the same as the start and end positions of the third data sequences. The two third data sequences are sequentially transmitted in adjacent OFDM symbols.

Figure 11:
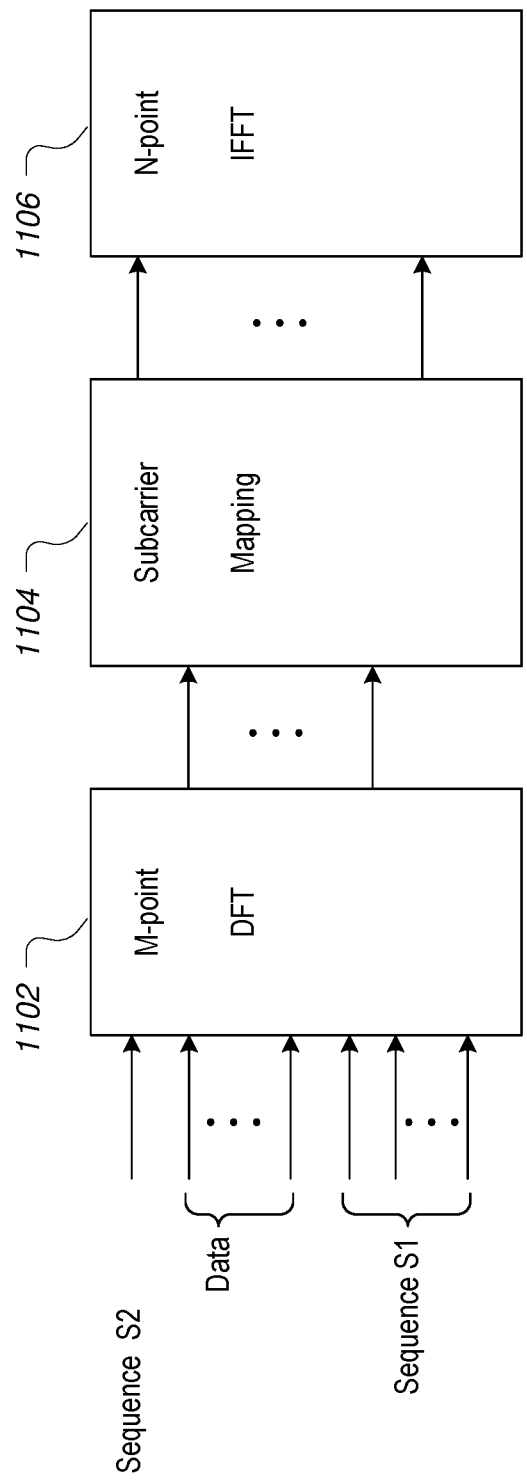
FIG. 11 shows an example of a waveform modulation processing device.

FIG. 11 is an example of a waveform modulation processing device. It is assumed that the first data sequence forms the third data sequence as shown in FIG. 10. The waveform modulation processing device includes an M-point discrete Fourier transform (DFT) circuit 1102, a subcarrier mapping circuit 1104, and an N-point inverse fast Fourier transform (IFFT) circuit.

The head sequence S2 and the tail sequence S1 of the reference signal RS are inserted in front of and behind the first data sequences of a plurality of data blocks, respectively, to form a plurality of third data sequences. The third data sequences are arranged serially in the time domain, and then an M point DFT processing is performed to transform them into parallel frequency domain signals. Here, the value of M is the length of the third data sequence (e.g., the number of data elements). Then a subcarrier mapping is performed, and the position of some subcarriers is placed with data 0 to achieve oversampling. An N-point IFFT processing is then performed to transform the data into a serial time domain data. In a case of oversampling, N is larger than M.

Figure 12:
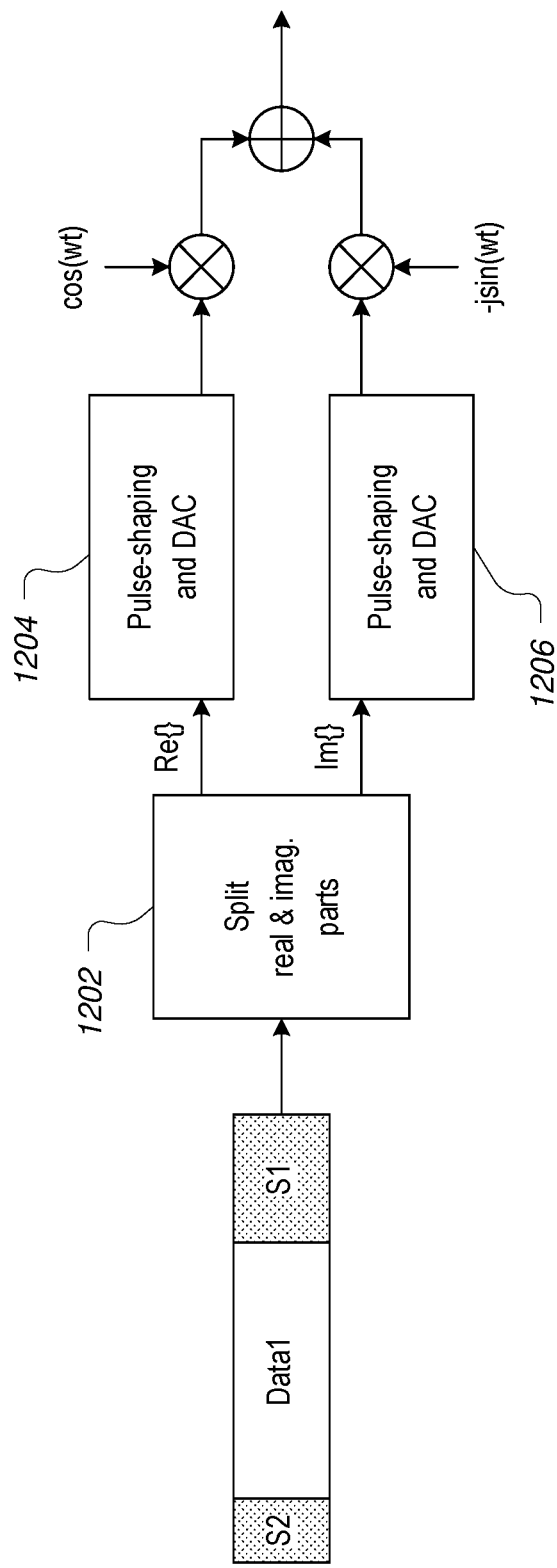
FIG. 12 shows an example of a waveform modulation processing device.

FIG. 12 is an example of a waveform modulation processing device. It is assumed that the first data sequence forms the third data sequence as shown in FIG. 10. The waveform modulation processing device includes a splitter circuit 1202, a first pulse-shaping and digital-to-analog circuit, and a second pulse-shaping and digital-to-analog circuit.

The head sequence S2 and the tail sequence S1 of the reference signal RS are inserted in front of and behind the first data sequences of a plurality of data blocks, respectively, to form a plurality of third data sequences. The head sequence S2, data sequence Data 1, and the tail sequence S1 are serialized in the time domain, and then the real part and the imaginary part of the data sequence are split to form a data sequence of the real part and a data sequence of the imaginary part, respectively. The data sequence of the real part and the data sequence of the imaginary part are then filtered and digital-to-analog converted (filtering may also occur before the real and imaginary parts are split; filtering and digital-to-analog conversion may also be in one module). The digital-to-analog converted signal is then transmitted (subsequently, modulated by a mixer to a carrier frequency for transmission).

Figure 13:
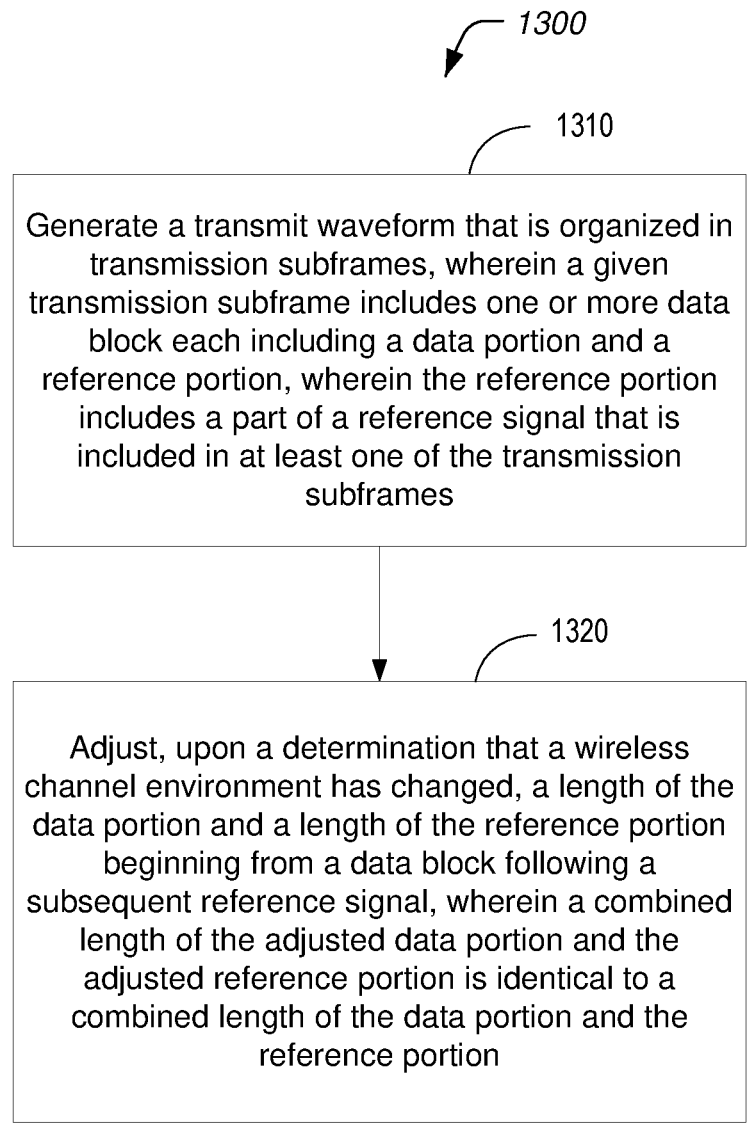
FIG. 13 is a flow diagram illustrating an example embodiment of a wireless communication method based on some embodiments of the disclosed technology.

FIG. 13 is a flow diagram illustrating an example of a wireless communication method 1300 based on some embodiments of the disclosed technology. The wireless communication method 1300 may include, at step 1310, generating a transmit waveform that is organized in transmission subframes, wherein a given transmission subframe includes one or more data block each including a data portion and a reference portion, wherein the reference portion includes a part of a reference signal that is included in at least one of the transmission subframes, and, at step 1320, adjusting, upon a determination that a wireless channel environment has changed, a length of the data portion and a length of the reference portion beginning from a data block following a subsequent reference signal, wherein a combined length of the adjusted data portion and the adjusted reference portion is identical to a combined length of the data portion and the reference portion.

Figure 14:
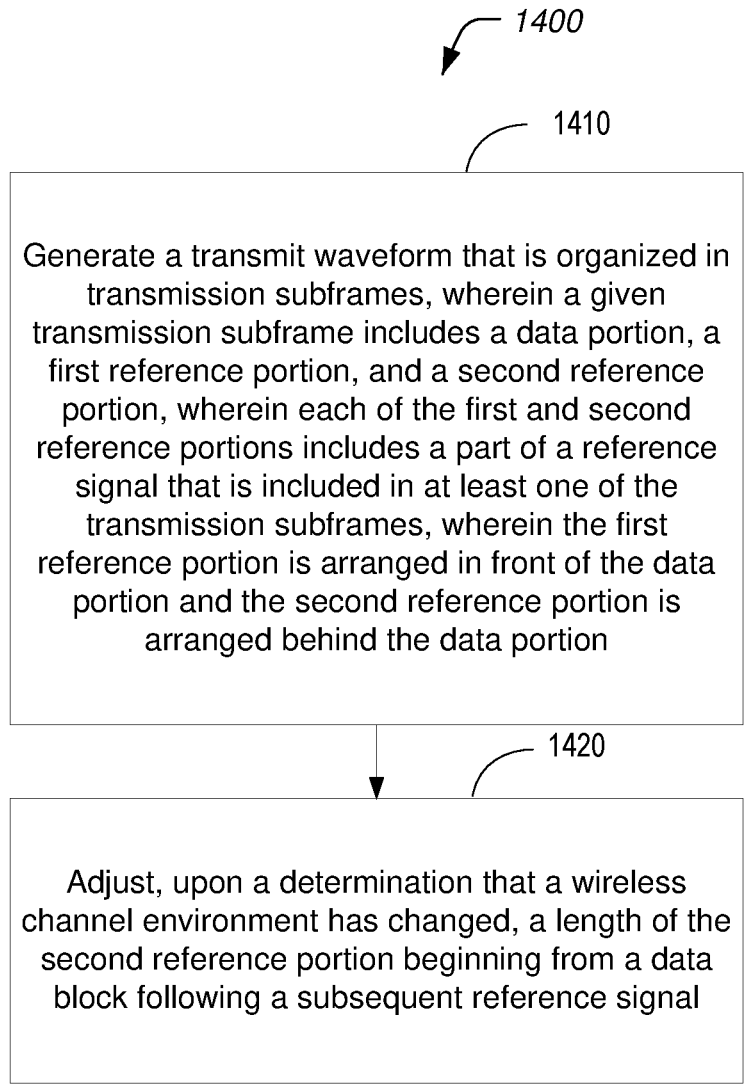
FIG. 14 is a flow diagram illustrating another example embodiment of a wireless communication method based on some embodiments of the disclosed technology.

FIG. 14 is a flow diagram illustrating another example of a wireless communication method 1400 based on some embodiments of the disclosed technology. The wireless communication method 1400 may include, at step 1410, generating a transmit waveform that is organized in transmission subframes, wherein a given transmission subframe includes a data portion, a first reference portion, and a second reference portion, wherein each of the first and second reference portions includes a part of a reference signal that is included in at least one of the transmission subframes, wherein the first reference portion is arranged in front of the data portion and the second reference portion is arranged behind the data portion, and, at step 1420, adjusting, upon a determination that a wireless channel environment has changed, a length of the second reference portion beginning from a data block following a subsequent reference signal.

In an example aspect, a wireless communication method is disclosed. The method includes inserting a tail sequence of a reference signal behind a first data sequence to form a second data sequence such that the second data sequence is transmitted in a data block.

In another example aspect, a wireless communication method is disclosed. The method includes a head sequence and a tail sequence of a reference signal in front of and behind a first data sequence, respectively, to form a third data sequence.

In some implementations, when the wireless channel environment changes, an adjusted tail sequence is inserted beginning from the first data block following the subsequent reference signal block. In this case, the lengths of tail sequences remain the same within the window between two adjacent reference signal blocks.

In some implementations, in the last data block between the two reference signal blocks, the length of the tail sequence inserted after the first data sequence is greater than or equal to the tail sequence of the first data block following the reference signal block behind the data block.

In some implementations, indication information is added in a control information format, and according to the indication information, the length of the tail sequence in which the reference sequence is inserted after the first data sequence can be determined.

In some implementations, when the wireless channel environment changes (e.g., when the amount of the multipath delay changes), the length of the tail sequence may change, but the length of the head sequence remains unchanged.

In another example aspect, a communication apparatus is disclosed. The apparatus comprises a processor configured to implement the methods discussed above.

In yet another example aspect, a computer program product having code stored thereon is disclosed. The code, when executed by a processor, causes the processor to implement the method discussed above.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising:
    generating a transmit waveform that is organized in transmission subframes, wherein a given transmission subframe includes a reference signal and a plurality of data blocks, each data block including a data portion and a reference portion arranged behind the data portion, wherein the reference portion includes a part of a reference signal that is included in at least one of the transmission subframes,
    wherein, according to an indication information in a control information format transmitted by a downlink or uplink control channel, a length of the reference portion in data blocks included in a subsequent transmission subframe that is subsequent to the transmission subframe is adjusted beginning from a first data block of the subsequent transmission subframe.

2. The method of claim 1, wherein the reference portion is lengthened upon a determination that an amount of a multipath delay has increased or is shortened upon a determination that the amount of the multipath delay has decreased.

3. The method of claim 1, wherein a combined length of a data portion and a reference portion after an adjustment is identical to a combined length of the data portion and the reference portion before the adjustment.

4. The method of claim 1, wherein a length of the reference portion remains unchanged until a subsequent reference signal is arranged or until a subsequent subframe starts.

5. The method of claim 1, wherein the reference signal is mapped and transmitted on a time domain resource, and the reference portion is a tail part of the reference signal.

6. The method of claim 1, wherein the reference signal is prefixed to the transmit waveform.

7. The method of claim 1, wherein the reference portion is arranged behind the data portion.

8. A wireless communication method, comprising:
    generating a transmit waveform that is organized in transmission subframes, wherein a given transmission subframe includes a data portion, a first reference portion, and a second reference portion, wherein each of the first and second reference portions includes a part of a reference signal that is included in at least one of the transmission subframes, wherein the first reference portion is arranged in front of the data portion and the second reference portion is arranged behind the data portion,
    wherein, according to an indication information in a control information format transmitted by a downlink or uplink control channel, a length of the reference portion in data blocks included in a subsequent transmission subframe that is subsequent to the transmission subframe is adjusted beginning from a first data block of the subsequent transmission subframe.

9. The method of claim 8, wherein a length of the first reference portion remains unchanged even upon a determination that a wireless channel environment has changed.

10. The method of claim 8, wherein a combined length of a data portion, a first reference portion, and a second reference portion after an adjustment is identical to a combined length of the data portion, the first reference portion, and the second reference portion before the adjustment.

11. The method of claim 8, wherein the first and second reference signals are mapped and transmitted on a time domain resource, and wherein the first reference portion is a head part of the reference signal and the second reference portion is a tail part of the reference signal.

12. The method of claim 8, wherein the second reference portion is lengthened upon a determination that an amount of a multipath delay has increased or is shortened upon a determination that the amount of the multipath delay has decreased.

13. The method of claim 8, wherein a length of the second reference portion remains unchanged until a subsequent reference signal is arranged or until a subsequent subframe starts.

14. A wireless communication method, comprising:
 receiving a transmit waveform that is organized in transmission subframes, wherein a given transmission subframe includes a data portion and a reference portion, wherein the reference portion includes a copy of a part of a reference signal that is included in at least one of the transmission subframes; and
 determining wireless communication information with respect to a subframe based on the reference portion in the subframe,
 wherein, according to an indication information in a control information format transmitted by a downlink or uplink control channel, a length of the reference portion in data blocks included in a subsequent transmission subframe that is subsequent to the transmission subframe is adjusted beginning from a first data block of the subsequent transmission subframe.

15. The method of claim 14, wherein the reference portion is arranged behind the data portion.

* * * * *